United States Patent
Fu et al.

(10) Patent No.: US 7,822,209 B2
(45) Date of Patent: Oct. 26, 2010

(54) METHODS AND SYSTEMS FOR KEY RECOVERY FOR A TOKEN

(75) Inventors: Christina Fu, Mountain View, CA (US); Nang Kon Kwan, Mountain View, CA (US); Steven William Parkinson, Mountain View, CA (US); Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1162 days.

(21) Appl. No.: 11/447,179

(22) Filed: Jun. 6, 2006

(65) Prior Publication Data

US 2007/0280483 A1    Dec. 6, 2007

(51) Int. Cl.
H04L 9/08 (2006.01)
G06F 21/00 (2006.01)

(52) U.S. Cl. .......................... 380/284; 380/281; 726/9; 713/185

(58) Field of Classification Search .................. 380/281, 380/284, 286; 726/9; 713/185
See application file for complete search history.

(56) References Cited

U.S. PATENT DOCUMENTS

| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |

(Continued)

FOREIGN PATENT DOCUMENTS

WO    9724831    7/1997

OTHER PUBLICATIONS

"ATM and Credit Card Notification", Feb. 2005 (internet archive) pp. 1-2, www.therareplaces.com/infgdes/money.atmnotif.htm.

(Continued)

*Primary Examiner*—Christian LaForgia
(74) *Attorney, Agent, or Firm*—MH2 Technology Law Group LLP

(57) ABSTRACT

Methods, systems and computer readable mediums are provided for recovering keys. A key transport session key is generated, and a key encryption key is derived based on a server master key and an identification associated with a token. The key transport session key is encrypted with the key encryption key as a first wrapped key transport session key. An encrypted storage session key and an encrypted private key are retrieved from an archive. The encrypted storage session key is decrypted with a server storage key as a storage session key. The encrypted private key is decrypted with the storage session key. The decrypted private key is encrypted with the key transport session key as a wrapped private key. The wrapped private key and the first wrapped key transport session key are forwarded.

18 Claims, 5 Drawing Sheets

U.S. PATENT DOCUMENTS

| | | |
|---|---|---|
| 5,862,310 A | 1/1999 | Crawford et al. |
| 5,923,884 A | 7/1999 | Peyret et al. |
| 5,937,066 A | 8/1999 | Gennaro et al. |
| 5,991,411 A | 11/1999 | Kaufman et al. |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,539,093 B1 | 3/2003 | Asad et al. |
| 6,636,975 B1 | 10/2003 | Khidekel et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,602,910 B2 | 10/2009 | Johansson et al. |
| 2001/0036276 A1* | 11/2001 | Ober et al. ................. 380/286 |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1* | 8/2002 | Gien et al. ................. 713/156 |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2003/0005291 A1 | 1/2003 | Burn |
| 2003/0012386 A1* | 1/2003 | Kim et al. ................. 380/286 |
| 2003/0028664 A1 | 2/2003 | Tan et al. |
| 2003/0035548 A1* | 2/2003 | Kwan ........................ 380/286 |
| 2003/0056099 A1* | 3/2003 | Asanoma et al. ............ 713/172 |
| 2003/0075610 A1 | 4/2003 | Ong |
| 2003/0093695 A1 | 5/2003 | Dutta |
| 2003/0115455 A1* | 6/2003 | Aull et al. .................... 713/156 |
| 2003/0115466 A1* | 6/2003 | Aull et al. .................... 713/172 |
| 2003/0115467 A1 | 6/2003 | Aull et al. |
| 2003/0115468 A1* | 6/2003 | Aull et al. .................... 713/175 |
| 2003/0167399 A1 | 9/2003 | Audebert et al. |
| 2003/0172034 A1 | 9/2003 | Schneck et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 | 5/2004 | Band |
| 2004/0103325 A1 | 5/2004 | Priebatsch |
| 2004/0120525 A1 | 6/2004 | Miskimmin et al. |
| 2004/0146163 A1 | 7/2004 | Asokan et al. |
| 2004/0153451 A1 | 8/2004 | Phillips et al. |
| 2004/0230831 A1 | 11/2004 | Spelman et al. |
| 2005/0022123 A1 | 1/2005 | Constantino |
| 2005/0109841 A1 | 5/2005 | Ryan et al. |
| 2005/0119978 A1 | 6/2005 | Ates |
| 2005/0123142 A1* | 6/2005 | Freeman et al. ............. 380/277 |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0173848 A1 | 8/2006 | Peterson et al. |
| 2006/0206932 A1 | 9/2006 | Chong |
| 2006/0208066 A1 | 9/2006 | Finn et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0204333 A1 | 8/2007 | Lear et al. |
| 2007/0230706 A1 | 10/2007 | Youn |
| 2007/0277032 A1 | 11/2007 | Relyea |
| 2007/0282881 A1 | 12/2007 | Relyea |
| 2007/0283163 A1 | 12/2007 | Relyea |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |

| | | |
|---|---|---|
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |

OTHER PUBLICATIONS

"AMD Announces Specification for Open Platform Management Architecture", Feb. 28, 2005, pp. 1-2, http://www.thefreelibrary.com/AMD + Announces + Specification +for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, No. 1993.

Schneier, "Applied Cryptography: Protocols, Algorithms, and Source Code in C", 1996, John Wiley & Sons, Inc., Second Edition, pp. 455-456.

Zuccherato, Robert, "Elliptic Curve Cryptography Support in Entrust", May 9, 2000.

PKCS#11 v2.20: Cryptographic Token Interface Standard, RSA Laboratories, Jun. 28, 2004 (see, e.g. Chapter 10, Objects) (see www.rsasecurity.com, 407 pgs).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

* cited by examiner

METHODS AND SYSTEMS FOR KEY RECOVERY FOR A TOKEN

DESCRIPTION OF THE INVENTION

1. Field of the Invention

The present invention relates in general to a key stored on a token, and more specifically to managing a key for the token.

2. Background of the Invention

Entities are more and more relying on tokens, such as a smart card, a security token, a USB (universal serial bus) token, or the like, to provide security. One of the risks of relying on tokens is that they can be lost, forgotten, broken, or stolen. When a token becomes lost or broken, a user typically wants to re-use the keys that were associated with the token to regain access to associated resources. For example, the user might still want to use the old keys to access computer resources, such as e-mail. Therefore, the user can be issued a new token, with the old keys loaded onto the token.

Generally accepted security practices do not allow a key to be extracted from a token. Thus, if a key has been archived for later recovery, the key will be not only generated outside the token, but also archived in storage separate from the token. When the key is to be transported to the token, security protocols must be maintained so that unauthorized persons do not have access to the keys.

Therefore, to address the above described problems and other problems, what is needed is a method and system for allowing the key to be recovered to the token from an archive while maintaining security.

SUMMARY OF THE INVENTION

Accordingly, one or more embodiments of the present invention provide methods, systems and computer readable mediums for recovering keys. A key transport session key is generated, and a key encryption key is derived based on a server master key and an identification associated with a token. The key transport session key is encrypted with the key encryption key as a first wrapped key transport session key. A storage session key and an encrypted private key are retrieved from an archive. The storage session key is decrypted with the server storage key. The encrypted private key is decrypted with the storage session key. The decrypted private key is encrypted with the key transport session key as a wrapped private key. The wrapped private key and the first wrapped key transport session key are forwarded.

One or more embodiments can provide a method, system, and computer readable medium for recovering keys. A security client is configured to manage a token when connected to the token. A security server is configured to interface with the security client. The security server is configured to generate a key transport session key and derive a key encryption key based on a server master key and an identification associated with the token, encrypt the key transport session key with the key encryption key as a first wrapped key transport session key, retrieve a storage session key and an encrypted private key from an archive, decrypt the encrypted private key with the storage session key, encrypt the decrypted private key with the key transport session key as a wrapped private key, and forward the wrapped private key and the wrapped session key to the security client.

One or more embodiments can provide a method, system, and computer readable medium for recovering a security key onto the token. A private key to be associated with a token is received. The received private key is enrolled onto the token, if the private key has not previously been enrolled. The private key is recovered onto the token, if the private key was previously enrolled. Both the enrolling and the recovering are the same instructions.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures.

DETAILED DESCRIPTION

Figure 1:
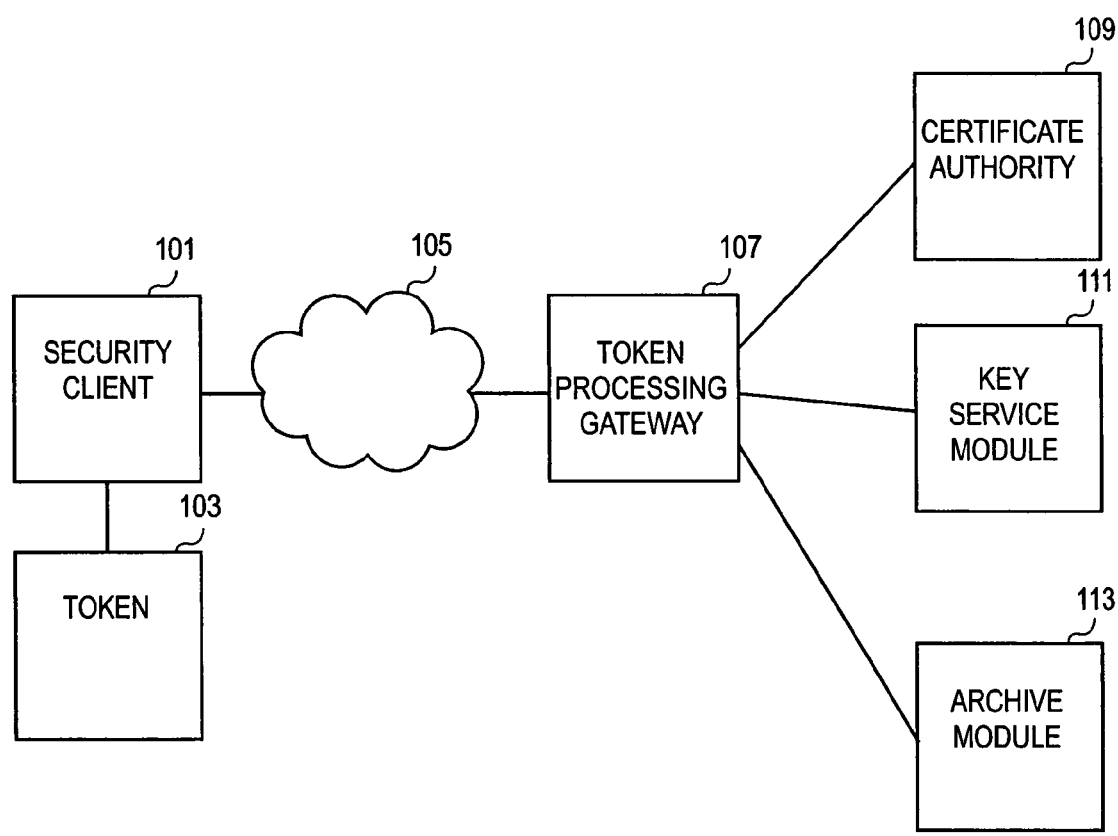
FIG. 1 illustrates a simplified and representative environment associated with a computer system.

In overview, the present disclosure concerns secure systems such as may be operated in connection with certifying and/or authenticating identifiers associated with users and/or computers and/or tokens. Such secure systems may be utilized in connection with other services such as communications, secured access, and/or telecommunications. Such secure systems can include computer systems which support the use of tokens to access independent data objects representing certificates, keys, security information, and related data, for example by providing end-user interfaces, managing keys, and providing authentication. More particularly, various inventive concepts and principles are embodied in systems, devices, and methods therein for recovering a key to a token.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to allow a key to be recovered to a token from an archive while maintaining security.

A system can be provided where private keys are stored in encrypted form by an archive module. Because security must be maintained, a token cannot simply retrieve its archived key. Moreover, the archived key should only be recovered onto a specific token to which it corresponds. Therefore, a method and system can be provided in which the archived key is retrieved, in response to a request from the token, while the various keys utilized in obtaining the private key from the archive and transporting the key are encrypted.

Reference will now be made in detail to the accompanying drawings. Wherever possible, the same reference numbers will be used throughout the drawings to refer to the same or like parts.

Referring now to FIG. 1, a simplified and representative environment associated with a computer system will be discussed and described. The environment includes a security client 101, a token 103, and a token processing gateway 107. The token processing gateway 107 and client 101 can be connected via a communication network 105, for example a wireless or wired communication network, such as the Internet, a LAN (local area network), an intranet or similar. The token processing gateway 107 can communicate with other servers, such as a certificate authority 109, a key service module 111, and an archive module 113.

The certificate authority 109 can be provided in accordance with well-known techniques.

The token processing gateway 107, key service module 111, and/or archive module 113 may be a computing machine or platform configured to execute secure and/or unsecure (or open) applications through an operating system (not shown). The token processing gateway 107, key service module 111, and/or archive module 113 can be implemented with server platforms as known to those skilled in the art from Intel, Advanced Micro Devices, Hewlett-Packard, and/or others.

The token processing gateway 107 may interact with the client 101 over the communication network 105. The communication network 105 can provide a communication channel for the token processing gateway 107 and the security client 101 to exchange data and commands, as well as for the token processing gateway 107 to interface to the token 103.

The token processing gateway 107, key service module 111, and archive module, and optionally the certificate authority 109, can together comprise a security server. Accordingly, the security client can further include a token processing gateway configured to manage the interface between the security client and the security server; a key service module configured to interface with the token processing gateway; a certificate authority module configured to interface with the token processing gateway and to retrieve certificates; and an archive module configured to interface with the token processing gateway and configured to maintain a database of private keys, wherein the archive module is configured to store the private key.

The security client 101 can be computing machine or platform (machine) configured to execute secure and/or open applications through the multi-user operating system. The security client 101 may be implemented on a personal computer, a workstation, a thin client, a thick client, or other similar computing platform. The security client 101 may be configured to interface with the token 103. The security client 101, the token 103 and the token processing gateway 107 can be configured in accordance with known techniques so that the token processing gateway 107 can connect to the token 103 transparently through the security client 101. In accordance with known techniques, the token processing gateway 107 can establish a secure connection to the security client 101 and/or to the token 103.

The key service module 111 can maintain master keys, such as a server master key. According to one or more embodiments, the server master key is stored separately from the token. When the token processing gateway 107 needs to establish a secure channel to the token 103 or security client 101, the key service module 111 derives secure keys.

The archive module 113 can maintain a store of encrypted private keys. The private keys in the store can be encrypted, for example by one or more storage session keys; the storage session key(s) can themselves be stored in encrypted form.

Figure 2:
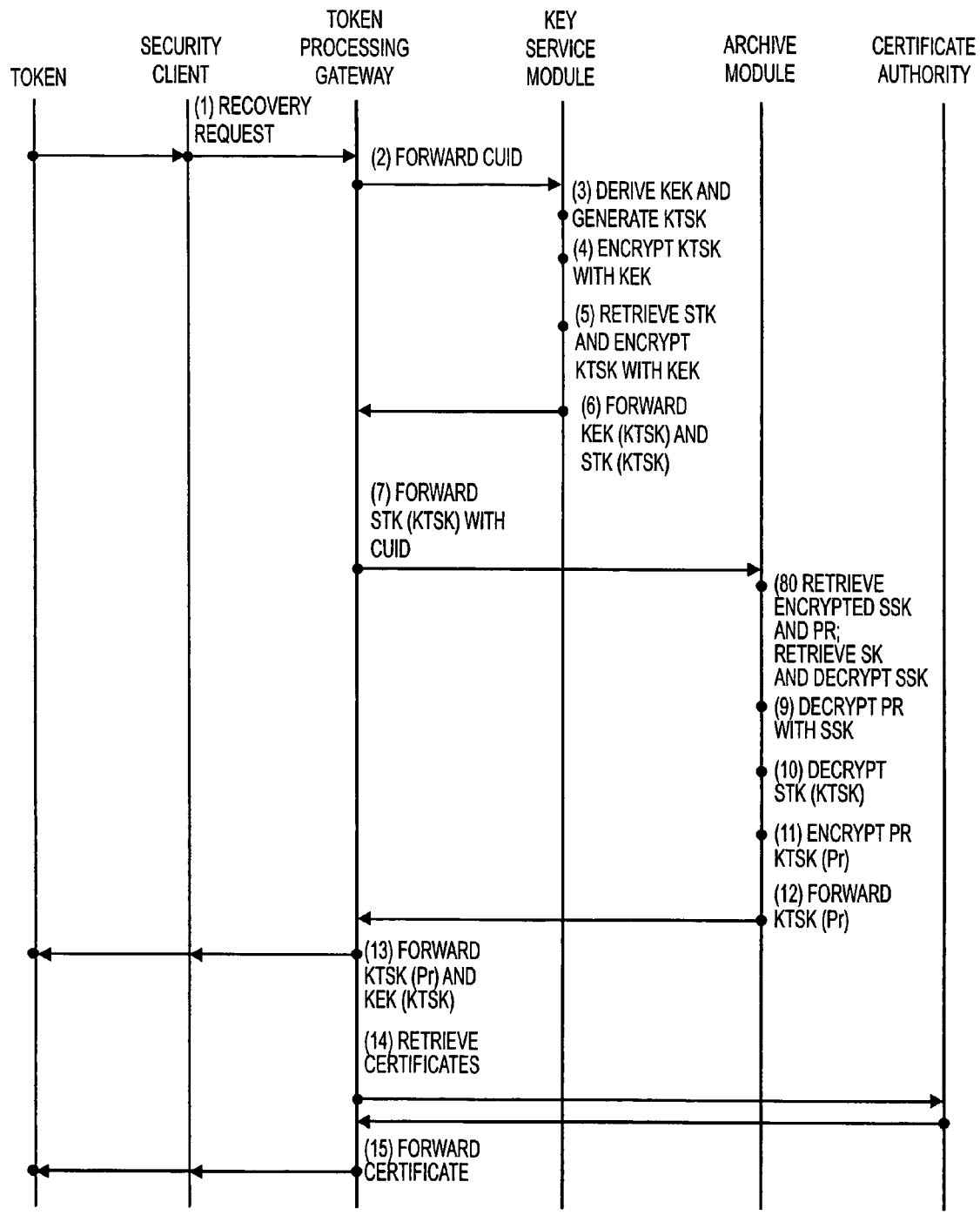
FIG. 2 is a diagram illustrating a data flow sequence.
Figure 3:
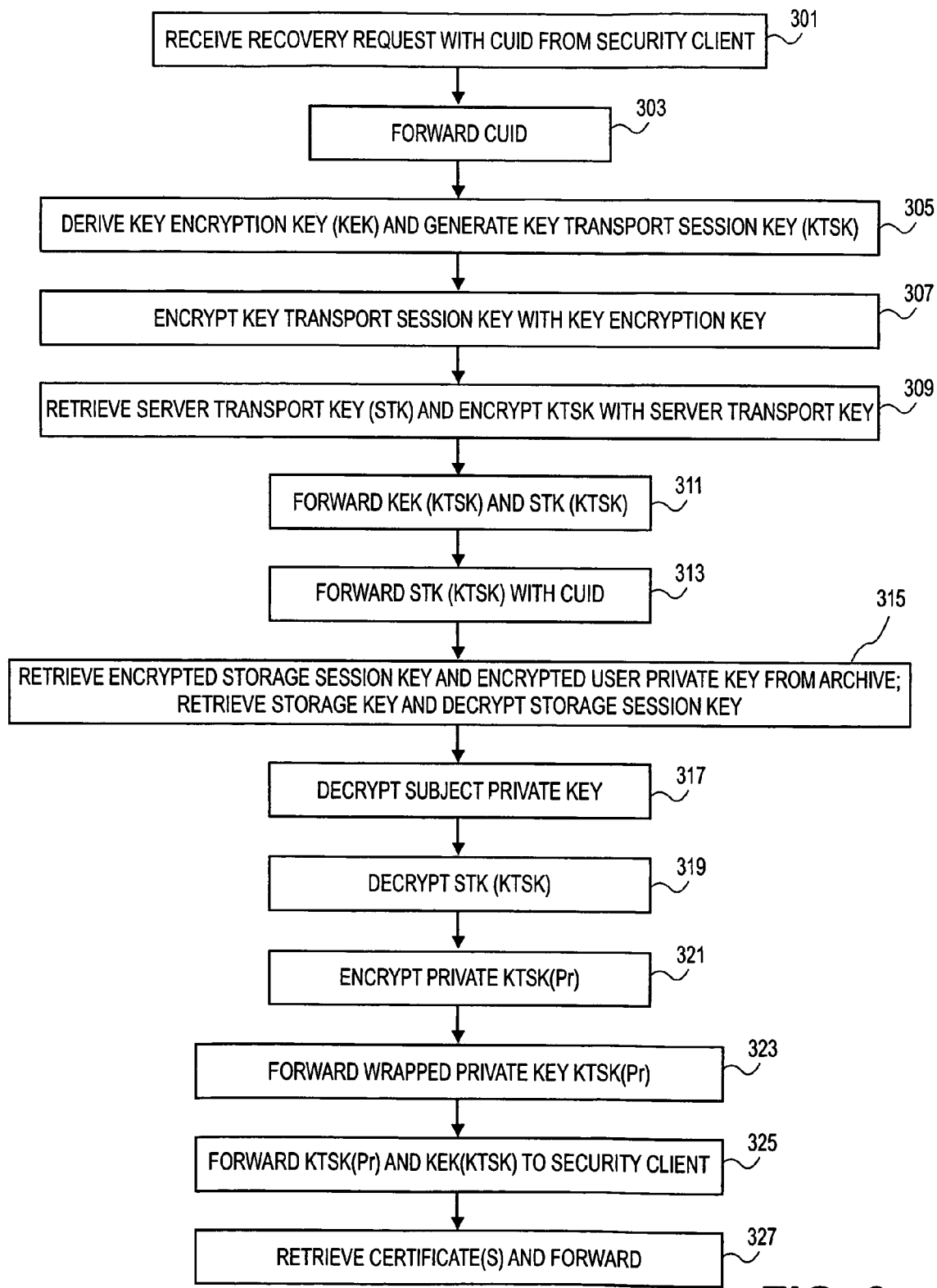
FIG. 3 is a flow chart illustrating a procedure for recovering keys.

In order to securely transfer the private key from the archive to the token, a sequence of secure transfers utilizes various keys. A data flow sequence among nodes including the token processing gateway, the key service module, and the archive module is discussed in connection with FIG. 2 and FIG. 3. FIG. 2 discussed the actions for a data flow, discussed in relation to each node. FIG. 3 provides a flow chart for the overall sequence of actions.

Referring now to FIG. 2, a diagram illustrating a data flow sequence will be discussed and described, in relation to each node. In overview, the nodes include the security client, the token processing gateway, the key service module, the archive module, and the certificate authority. The token (or security client) initiates the recovery, and eventually the token receives two keys: the private key (Pr) encrypted by a key transport session key (KTSK), and the key transport session key encrypted by a key encryption key (KEK) known to the token. Responsive to the request, the token processing gateway obtains the encrypted private key and encrypted key transport session key by forwarding the recovery request to the nodes that securely retrieve the private key, and obtains the certificates associated with the key, for example from the certificate authority. The key service module manages the keys used for securely transporting the private key amongst the nodes. The archive module retrieves the private key from the archive, and sends the private key encrypted with the key transport session key (KTSK(Pr)) to the token processing gateway. The following will discuss the actions at each node in more detail.

The recovery is initiated, for example indirectly by the token or the security client or a portion of the security server, and in response the token or security client receives the private key (Pr) encrypted by a key transport session key (KTSK), and the key transport session key encrypted by a key encryption key (KEK) known to the token. Then the token can decrypt the KTSK using the KEK, and use the KTSK to decrypt the private key. In this simple example, the token can initiate the recovery, for example, by issuing 1 a recovery request via the security client to the token processing gateway. Eventually, the token receives 13 two keys via the security client: a KTSK(Pr), which is a private key (Pr) encrypted by the key transport session key (KTSK) KTSK(Pr); and a KEK(KTSK), which is the KTSK encrypted by a key encryption key (KEK) KEK(KTSK). Because the KEK is known to the token, the token can decrypt the KTSK, and use the decrypted KTSK to decrypt the private key. Also, the token receives 15 the certificate for the key. The two keys can be written to the token via the security client, for example by the security server across a secure channel. Accordingly, one or more embodiments can provide that the security server is configured to connect to the token in accordance with the security client; and to write the private key to the token.

The token processing gateway obtains the encrypted private key and encrypted key transport session key by forwarding the recovery request to the nodes that securely retrieve the private key; the token processing gateway also obtains the certificates associated with the key. More particularly, the recovery request is associated with a card unique identifier (CUID). The token processing gateway forwards 2 the CUID to the key service module. In response, the token processing gateway receives 6 the key transport session key encrypted by the key encryption key KEK(KTSK) and the key transport session key encrypted by a server transport key (STK) STK(KTSK).

The token processing gateway then forwards 7 the key transport session key encrypted by the server transport key STK(KTSK) together with the CUID and optionally with a corresponding certificate to the archive module, which causes the archive module to recover the private key corresponding to the token. The server transport key, for example, can be a symmetric key that is shared between key service module and the archive module, or a public/private key relation where the public key is used for encryption while the private key is used for decryption, or the like.

The token processing gateway then receives 13 the private key encrypted by the key transport session key KTSK(Pr) and the key transport session key encrypted by the key encryption key KEK(KTSK). The token processing gateway also retrieves 14 a certificate(s) corresponding to the CUID from the certificate authority in accordance with well known techniques, or obtains a previously stored copy of the certificate, and forwards 15 the certificate(s) to the token/security client. Although the retrieval 14 and forwarding 15 of the certificates is illustrated as being performed after the keys are forwarded to the security client/token, it will be appreciated that the certificates can be retrieved and/or forwarded earlier in the sequence.

Accordingly, the token processing gateway can be further configured to forward the wrapped private key and the first wrapped key transport session key to the token, to retrieve at least one certificate for the token from the certificate authority module or from storage, and to forward the at least one certificate to the token.

The key service module manages the keys used for securely transporting the private key amongst the nodes. More particularly, upon receiving (2) the CUID with the recovery request, the key service module derives (3) the key encryption key (KEK) and generates the key transport session key (KTSK). Then, the key service module encrypts 4 the KTSK with the KEK to form an encrypted KTSK KEK(KTSK). The key service module retrieves 5 a server transport key (STK) which is also known to the archive module. Then, the key service module encrypts the key transport session key with the server transport key STK(KTSK). The key transport session key encrypted by the KEK KEK(KTSK) and encrypted by the server transport key STK(KTSK) are forwarded 6 to the token processing gateway.

Accordingly, one or more embodiments can provide that the key service module is further configured to generate the key transport session key, to derive the key encryption key, and to encrypt the key transport session key with the key encryption key as the first wrapped key transport session key.

The archive module retrieves the private key from the archive, and sends the private key encrypted with the key transport session key KTSK(Pr) to the token processing gateway. More particularly, the archive module retrieves 8 a storage session key (SSK) encrypted by a storage key (SK) SK(SSK) and the encrypted private key SSK(Pr) from the archive. The archive module also retrieves the storage key, which it uses to decrypt the storage session key. Then, the archive module decrypts 9 the encrypted private key SSK(Pr) with the storage session key SSK. The archive module also decrypts 10 the encrypted key transport session key STK(KTSK) with the server transport key STK. Then, the archive module encrypts 11 the private key with the key transport session key KTSK(Pr). The private key encrypted by the key transport session key KTSK(Pr) is then forwarded 12 to the token processing gateway.

The archive module according to various embodiments can be further configured to retrieve the encrypted storage session key and the encrypted private key from the archive, decrypt the encrypted storage session key, decrypt the encrypted private key with the decrypted storage session key, encrypt the decrypted private key with the key transport session key, and forward the wrapped private key to the token processing gateway.

Accordingly, one or more embodiments provide a system for recovering keys. The system can include a security client configured to manage a token when connected to the token. The system also can include a security server configured to interface with the security client, the security server being configured to generate a key transport session key and derive a key encryption key based on a server master key and an identification associated with the token, encrypt the key transport session key with the key encryption key as a first wrapped key transport session key, retrieve an encrypted storage session key and an encrypted private key from an archive, decrypt the encrypted storage session key decrypt the encrypted private key with the decrypted storage session key, encrypt the decrypted private key with the key transport session key as a wrapped private key, and forward the wrapped private key and the wrapped session key to the security client.

It should be understood that various logical groupings of functions are described herein in connection with various nodes. In different embodiments, functional grouping may be grouped differently, combined, or augmented. Furthermore, one or more functional grouping including those identified herein as optional can be omitted from various realizations. For example, the present description may describe or suggest a database or collection of data and information. One or more embodiments can provide that the database or collection of data and information can be distributed, combined, or augmented, or provided locally and/or remotely.

Referring now to FIG. 3, a flow chart illustrating a procedure for recovering keys will be discussed and described. The procedure can advantageously be implemented on, for example, a processor of a computing platform described in connection with FIG. 5 or other apparatus appropriately arranged. The processing in the procedure can be distributed among nodes, such as discussed in connection with FIG. 2, or similar devices which are appropriately arranged.

When the token sends a request to recover its private key, the process receives 301 the recovery request with a card unique identifier (CUID) corresponding to the token. The request is forwarded 303 to obtain keys for secure communications. Then, the process derives 305 the key encryption key (KEK) and generates the key transport session key (KTSK). Accordingly, one or more embodiments includes receiving a recovery request, wherein the generating and deriving are in response to the recovery request.

The KEK is derived by applying a known function, for example to a server master key having a relation to the keys on the token, including the KEK. This allows the procedure, which can own the server master key, to use the KEK to securely communicate with the intended recipient (here, the token). Thus according to one or more embodiments, the key encryption key is derived based on a server master key and an identification associated with the token. The KTSK is generated by creating a key, such as new key, that is not necessarily derived from or corresponding to the master key or any symmetric key on the token.

The procedure encrypts 307 the KTSK by the KEK, to create a KEK encrypted key transport session key. The procedure also retrieves 309 the server transport key STK, and encrypts the KTSK with the server transport key, to create STK encrypted key transport session key. Then, the procedure forwards 311 the KEK(KTSK) and STK(KTSK). Also, the procedure forwards 313 the STK(KTSK) with the CUID.

The procedure then retrieves 315 the storage session key, encrypted by a storage key, and the user private key, encrypted by the storage session key, from the archive. The procedure also retrieves the storage key, and uses the storage key to decrypt the encrypted storage session key. Using the storage session key, the procedure decrypts 317 the encrypted private key.

The procedure also decrypts 319 the STK encrypted key transport session key STK(KTSK). Then, the procedure encrypts 321 the private key with the key transport session key, to create a KTSK encrypted private key KTSK(Pr).

The KTSK encrypted private key KTSK(Pr) is forwarded 323. Also, the procedure forwards 325 the KTSK encrypted private key KTSK(Pr) and the KEK encrypted KTSK KEK (KTSK), so that the KTSK(Pr) and KEK(KTSK) are written to the token. Accordingly, one more embodiments provide that the wrapped private key and the wrapped session key are forwarded to the token.

The procedure further retrieves one or more certificates and forwards these to the token. The certificates can be retrieved earlier in the procedure, that is, any time after the recovery request is received. Accordingly, one or more embodiments includes retrieving at least one certificate associated with the token; and forwarding the at least one certificate.

Accordingly, embodiments provide a method of recovering keys, including generating a key transport session key, and deriving a key encryption key based on a server master key and an identification associated with a token; first encrypting the key transport session key with the key encryption key as a first wrapped key transport session key; retrieving a storage session key and an encrypted private key from an archive; first decrypting the storage session key with a server storage key; second decrypting the encrypted private key with the storage session key; second encrypting the decrypted private key with the key transport session key as a wrapped private key; and forwarding the wrapped private key and the first wrapped key transport session key. Optionally, the method can include retrieving a server transport key and encrypting the key transport session key with the server transport key as a second wrapped key transport session key; and forwarding the second wrapped key transport session key and the first wrapped key transport session key, and decrypting the second wrapped key transport session key.

Optionally, a challenge can be utilized to verify that the private key was received by the token for which the private key was intended. Techniques for conducting challenges are known. The challenge can be initiated by the token, or can be received and responded to by the token. Accordingly, one or more embodiments can include after the forwarding, sending a challenge to the token; receiving a response to the challenge; and checking the accuracy of the response. Alternative embodiments can include, after the forwarding: receiving a challenge; and sending a response to the challenge. Accordingly, the security client can be configured to participate in a challenge to the token, in order to confirm that the private key was written to the token.

Figure 4:
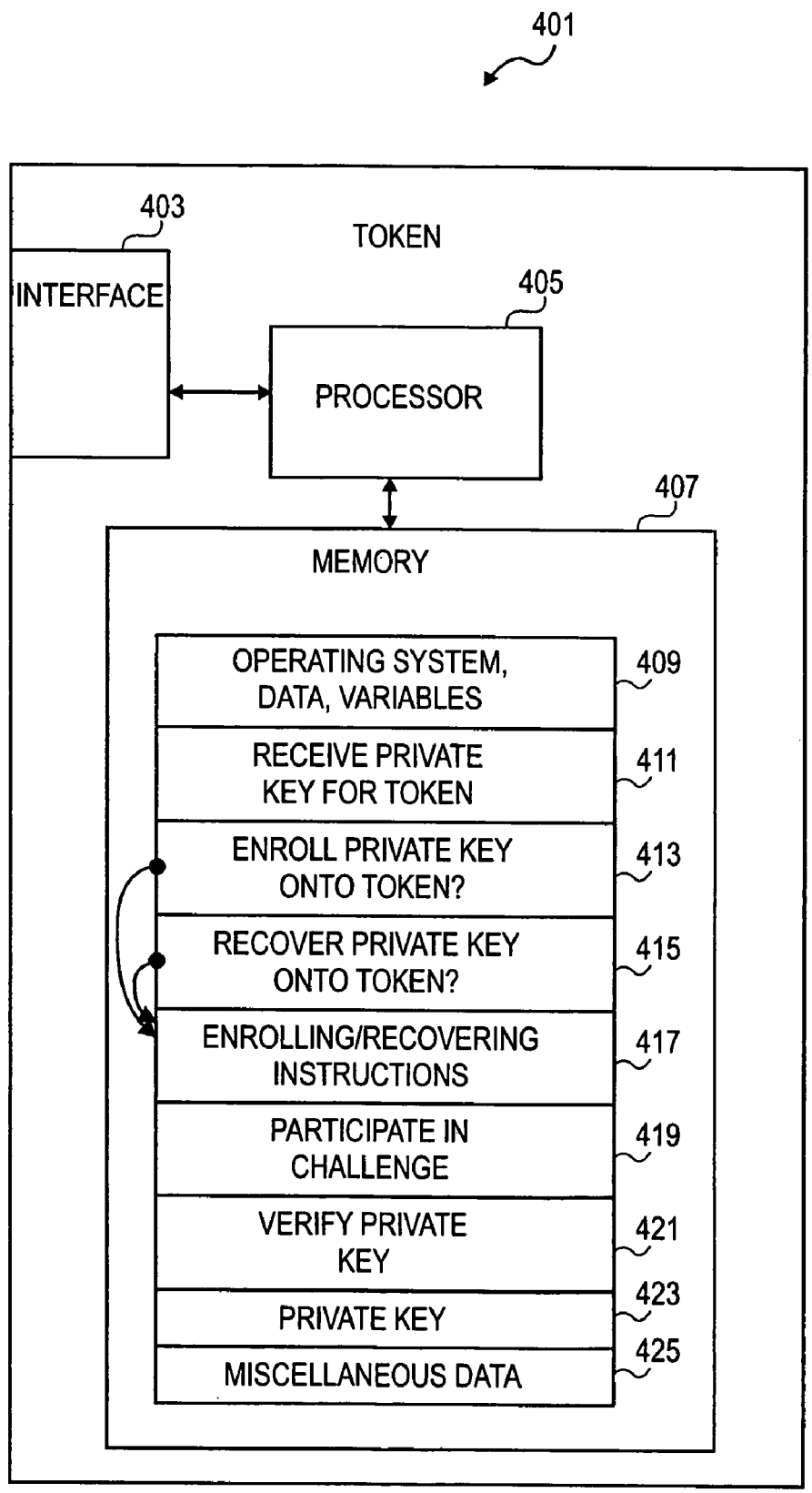
FIG. 4 is a block diagram illustrating portions of an exemplary token.

Referring now to FIG. 4, a block diagram illustrating portions of an exemplary token 401 will be discussed and described. The token 401 may include an interface 403 such as a USB (universal serial bus) connection, a processor 405 and a memory 407. Other portions of the token 401 are well understood and will be omitted from the discussion.

The processor 405 may comprise one or more microprocessors and/or one or more digital signal processors. The memory 407 may be coupled to the processor 405 and may comprise a read-only memory (ROM), a random-access memory (RAM), a programmable ROM (PROM), a flash memory, and/or an electrically erasable read-only memory (EEPROM). The memory 407 may include multiple memory locations for storing, among other things, an operating system, data and variables 409 for programs executed by the processor 405; computer programs for causing the processor to operate in connection with various functions such as receiving 411a private key for a token, jumping 413 to enroll a private key onto the token, jumping 415 to recover the private key onto the token, enrolling/recovering 417 the key, participating 419 in a challenge, verifying 421 the private key, and/or other processing; a location where the private key is stored 423; and a location for miscellaneous other data 425 used by the processor 405 such as other keys, certificates, and identifiers. The computer programs may be stored, for example, in ROM or PROM and may direct the processor 405 in controlling the operation of the token 401.

The processor 405 may be programmed for receiving 411a private key for a token. The private key can be received via the interface 403, in accordance with known techniques.

The received private key can be determined to be enrolled if it is already in the storage space for the private key 423. To determine if the private key is enrolled, for example, the contents of the stored private key 423 can be compared to determine if it is the same as the received private key, or the stored private key 423 can be checked to see if it has an initial value such as zero or all ones. Alternatively, the private key can be received with an indication that it is to be enrolled, or to be recovered. The term "enrolling" is used herein to refer to initially loading a private key onto the token, whereas recovery refers to retrieving an archived private key to the token.

If the private key is to be enrolled 413 onto the token, or if the private key is to be recovered 415 onto the token, the processor 405 proceeds to execute the same instructions, namely, the program for enrolling/recovering 417 the key. Generally, memory 407 on the token 401 is quite limited. To more efficiently process the enrolling and the recovering of the private key, both the enrolling and the recovering utilize the same program 417 and execute the same instructions in the processor 405. Because the instructions for the enrolling and the recovering are one and the same, the processor 405 can efficiently utilize the memory 407 on the token 401.

Accordingly, one or more embodiments can provide for recovering a security key onto the token, including receiving a private key to be associated with a token; enrolling the received private key onto the token, if the private key has not previously been enrolled; and recovering the private key onto the token, if the private key was previously enrolled, wherein both the enrolling and the recovering are the same instructions.

Optionally, the processor 405 can be programmed for participating 419 in a challenge, utilizing known techniques. The challenge provides verification that the token received and properly loaded the private key. The challenge can be initiated by the token, or can be received and responded to by the token. Accordingly, one or more embodiments can provide for participating in a challenge prior to at least one of the enrolling and the recovering, to confirm that the private key was written to the token.

The processor 405 can be programmed for verifying 421 the private key. The private key that is sent to the token can additionally be signed, for example with a symmetric key known to the token and one or more trusted sources. If the private key is signed, it can be verified by the token to ensure that the key is from a trusted source. Accordingly, one or more embodiments can provide that the private key is signed, further comprising instructions for verifying the signed private key.

Figure 5:
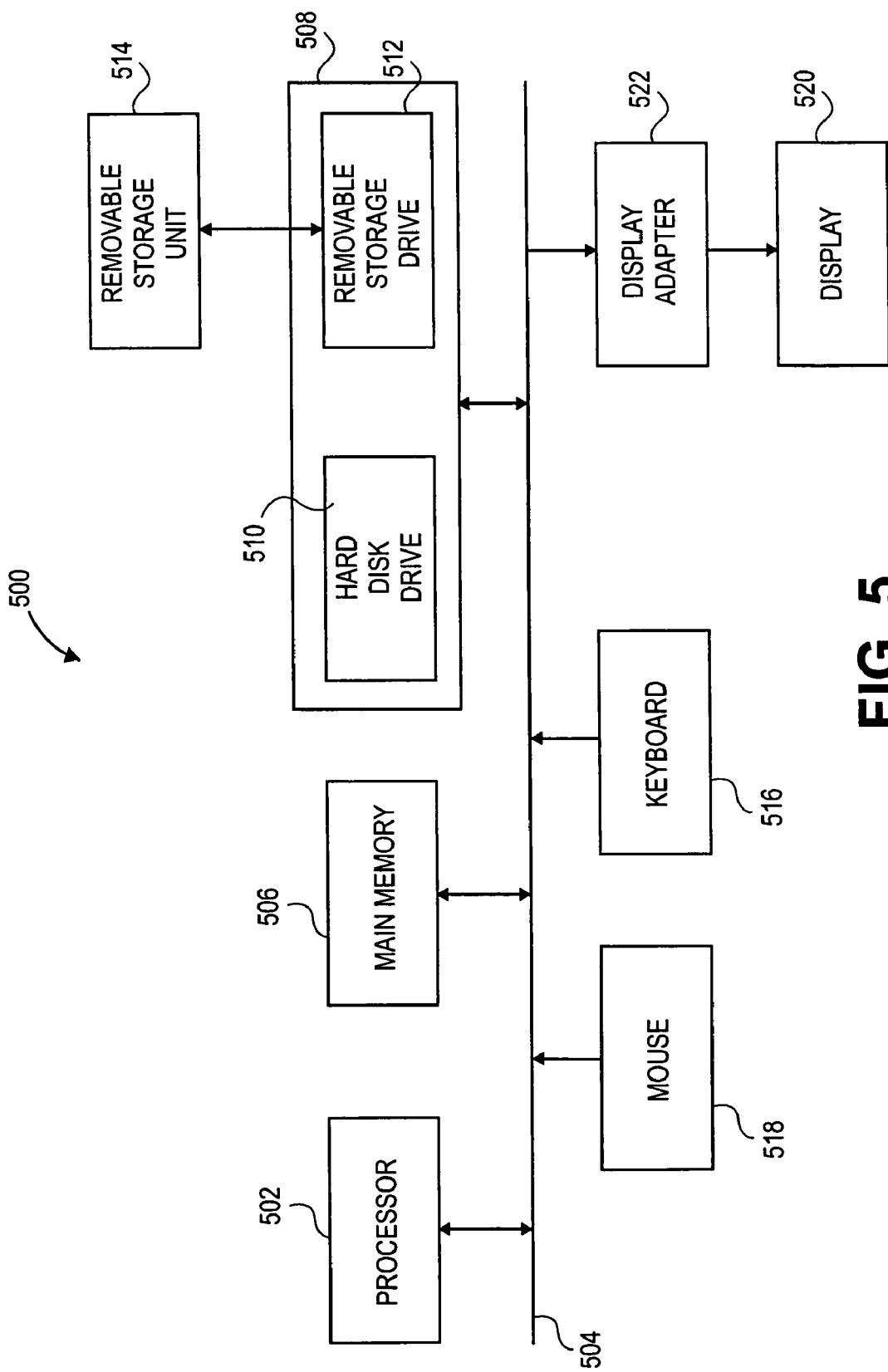
FIG. 5 is a block diagram of a computing platform.

Referring now to FIG. 5, a block diagram of a computing platform 500 will be discussed and described. The functions of the security client, the token processing gateway, the key service module, and/or the archive module can be implemented in program code and executed by the computing platform 500. The security client, the token processing gateway, the key service module, and/or the archive module may be implemented in computer languages such as PASCAL, C, C++, JAVA, and the like.

As shown in FIG. 5, the computing platform 500 can include one or more processors such as the illustrated processor 502 that provide an execution platform for embodiments of the security client, the token processing gateway, the key service module, and/or the archive module. Commands and data from the processor 502 can be communicated over a communication bus 504. The computing platform 500 can include a main memory 506, such as a Random Access Memory (RAM), where the security client, the token processing gateway, the key service module, and/or the archive module may be executed during runtime; and a secondary memory 508. The secondary memory 508 can include, for example, a hard disk drive 510 and/or a removable storage drive 512, representing a floppy diskette drive, a magnetic tape drive, a compact disk drive, and the like, where a copy of a computer program embodiment for the security client and token management system may be stored. The removable storage drive 512 can read from and/or write to a removable storage unit 514 in a well-known manner. Optionally, a user interface can with the security client, the token processing gateway, the key service module, and/or the archive module with a keyboard 516, a mouse 518, and a display 520. The display adapter 522 can interface with the communication bus 504 and the display 520 and can receive display data from the processor 502 and converts the display data into display commands for the display 520.

Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should be noted that the term token denotes a small, portable device which typically has an embedded integrated circuit with microprocessor, memory and internal operating system, which stores electronic data and programs, and which is typically utilized for security and/or establishing an identity. Examples of tokens include devices which are sometimes referred to as smartcards, contactless cards, cryptographic tokens, authentication tokens, USB (universal serial bus) tokens, USB keys, USB buttons, and the like, and variants or evolutions thereof. Tokens may transfer data in combination with a wireless protocol, a serial or parallel data transfer protocol such as USB, or variations and evolutions of data transfer protocols. Tokens can operate in connection with standards such as ISO/IEC (International Organization for Standardization/International Electrotechnical Commission) 7816, ISO/IEC 7810, ISO 14443 RFID (radio frequency identification), ISO 15693 RFID, EMV (Europay Mastercard Visa) version 4.00, PC/SC (personal computer/smart card), and/or other standards; custom protocols and definitions; and variants and evolutions thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of recovering keys, comprising:
generating a key transport session key;
deriving, by a processor, a key encryption key based on a server master key and an identification associated with a token;
encrypting the key transport session key with the key encryption key as a first wrapped key transport session key;
retrieving an encrypted storage session key and an encrypted private key from an archive;
decrypting the encrypted storage session key with a server storage key as a storage session key;
decrypting the encrypted private key with the storage session key;
encrypting the decrypted private key with the key transport session key as a wrapped private key; and
forwarding the wrapped private key and the first wrapped key transport session key.

2. The method of claim 1, further comprising:
retrieving a server transport key and encrypting the key transport session key with the server transport key as a second wrapped key transport session key;
forwarding the second wrapped key transport session key and the first wrapped key transport session key, and decrypting the second wrapped key transport session key.

3. The method of claim 1, wherein the server master key is stored separately from the token.

4. The method of claim 1, wherein the wrapped private key and the wrapped session key are forwarded to the token.

5. The method of claim 1, further comprising:
retrieving at least one certificate associated with the token; and
forwarding the at least one certificate.

6. The method of claim 1, further comprising receiving a recovery request, wherein the generating and deriving are in response to the recovery request.

7. The method of claim 1, further comprising, after the forwarding:
sending a challenge to the token;
receiving a response to the challenge; and
checking the accuracy of the response.

8. The method of claim 1, further comprising, after the forwarding:
receiving a challenge; and
sending a response to the challenge.

9. An apparatus comprising:
a memory containing instructions; and
a processor, coupled to the memory, that executes the instructions to perform the method of claim 1.

10. A non-transitory computer-readable medium comprising computer instructions for implementing the method of claim 1.

11. A system for recovering keys, comprising:
a security client configured to manage a token when connected to the token; and
a security server computer configured to interface with the security client, the security server computer being configured to generate a key transport session key and derive a key encryption key based on a server master key and an identification associated with the token, encrypt the key transport session key with the key encryption key as a first wrapped key transport session key, retrieve a storage session key and an encrypted private key from an archive, decrypt the encrypted private key with the storage session key, encrypt the private key with the key transport session key as a wrapped private key, and forward the wrapped private key and the wrapped session key to the security client.

12. The system of claim 11, wherein the security server computer is further configured to:
connect to the token in accordance with the security client; and
write the private key to the token.

13. The system of claim 12, wherein the security client is further configured to participate in a challenge to the token, to confirm that the private key was written to the token.

14. The system of claim 11, wherein the storage session key is encrypted, further comprising decrypting the storage session key with a server storage key.

15. The system of claim 11, wherein the security server computer further comprises:
a token processing gateway configured to manage the interface between the security client and the security server computer;
a key service module configured to interface with the token processing gateway;
a certificate authority module configured to interface with the token processing gateway and to retrieve certificates; and
an archive module configured to interface with the token processing gateway and configured to maintain a database of private keys, wherein the archive module is configured to store the private key.

16. The system of claim 15, wherein the key service module is further configured to generate the key transport session key, to derive the key encryption key, and to encrypt the key transport session key with the key encryption key as the first wrapped key transport session key.

17. The system of claim 15, wherein the archive module is further configured to retrieve the storage session key and the encrypted private key from the archive, decrypt the encrypted private key with the storage session key, encrypt the decrypted private key with the key transport session key, and forward the wrapped private key to the token processing gateway.

18. The system of claim 15, wherein the token processing gateway is further configured to forward the wrapped private key and the first wrapped key transport session key to the token, to retrieve at least one certificate for the token, and to forward the at least one certificate to the token.

* * * * *